(12) United States Patent
Kanatsu

(10) Patent No.: US 8,045,801 B2
(45) Date of Patent: Oct. 25, 2011

(54) IMAGE PROCESSING APPARATUS AND METHOD

(75) Inventor: Tomotoshi Kanatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 11/468,918

(22) Filed: Aug. 31, 2006

(65) Prior Publication Data

US 2007/0053602 A1    Mar. 8, 2007

(30) Foreign Application Priority Data

Sep. 2, 2005 (JP) ................................. 2005-255613

(51) Int. Cl.
*G06K 9/34* (2006.01)
*G06K 9/36* (2006.01)
*G06K 9/46* (2006.01)

(52) U.S. Cl. ......... 382/176; 382/173; 382/232; 382/244

(58) Field of Classification Search .................. 382/171, 382/173, 176, 180, 232
See application file for complete search history.

(56) References Cited

U.S. PATENT DOCUMENTS

| 5,539,842 | A * | 7/1996 | Schwartz | 382/232 |
| 5,680,478 | A | 10/1997 | Wang et al. | 382/176 |
| 6,243,713 | B1 * | 6/2001 | Nelson et al. | 1/1 |
| 2002/0037097 | A1 * | 3/2002 | Hoyos et al. | 382/137 |
| 2002/0037100 | A1 * | 3/2002 | Toda et al. | 382/166 |
| 2002/0085243 | A1 * | 7/2002 | Kanatsu | 358/453 |
| 2003/0110181 | A1 * | 6/2003 | Schuetze et al. | 707/103 R |
| 2003/0210803 | A1 * | 11/2003 | Kaneda et al. | 382/100 |
| 2005/0117803 | A1 * | 6/2005 | Ikeda et al. | 382/190 |
| 2006/0045386 | A1 * | 3/2006 | Fukuoka et al. | 382/305 |
| 2006/0072830 | A1 * | 4/2006 | Nagarajan et al. | 382/224 |
| 2006/0082595 | A1 * | 4/2006 | Liu et al. | 345/629 |
| 2006/0251339 | A1 * | 11/2006 | Gokturk et al. | 382/305 |
| 2007/0140560 | A1 * | 6/2007 | Katsuyama et al. | 382/176 |
| 2007/0172137 | A1 * | 7/2007 | Mori | 382/239 |

FOREIGN PATENT DOCUMENTS

| JP | 2002-077633 | 3/2002 |
| JP | 2004-348467 A | 12/2004 |
| JP | 2005-056907 A | 3/2005 |
| JP | 2005-204206 A | 7/2005 |

OTHER PUBLICATIONS

The above foreign patent documents were cited in a Jan. 6, 2011 Japanese Office Action, which is enclosed with a partial English Translation, that issued in Japanese Patent Application No. 2005-255613.

* cited by examiner

*Primary Examiner* — Samir Ahmed
*Assistant Examiner* — Li Liu
(74) *Attorney, Agent, or Firm* — Cowan, Liebowitz & Latman, P.C.

(57) ABSTRACT

An image processing apparatus segments an image into a plurality of regions in accordance with attributes of a plurality of types, and acquires feature amount data from image information of a region of a first attribute (an image region) from among the plurality of regions. The apparatus then applies compression processing to the image and acquires compressed data. The apparatus outputs the acquired feature amount data and compressed data as output data of the image.

11 Claims, 10 Drawing Sheets

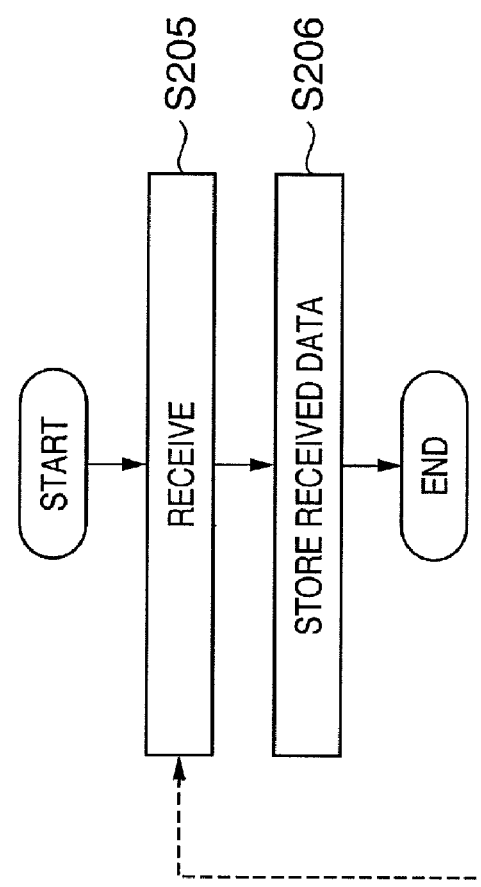
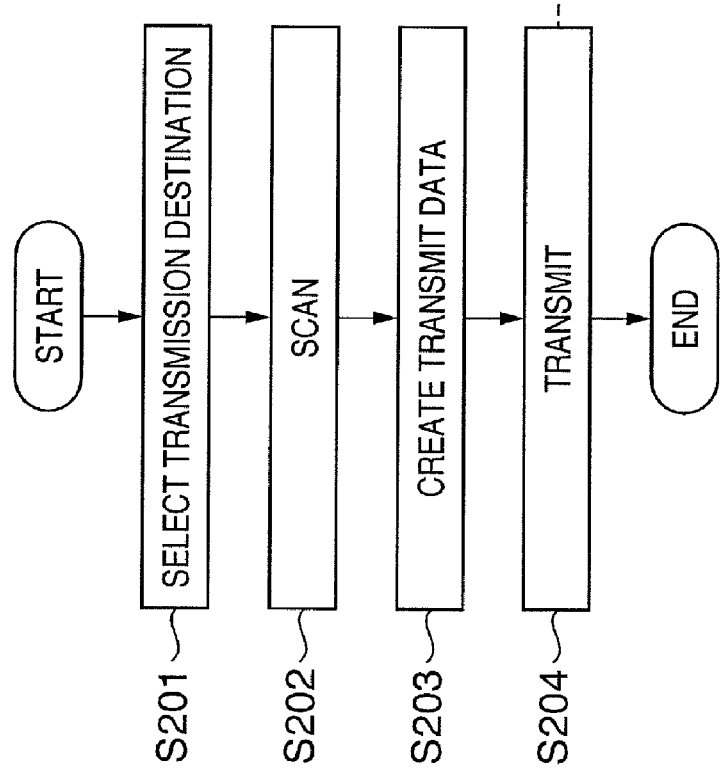

FIG. 8

```
:
<Descriptor xsi : type="EdgeHistogramType">
<BinCounts>
    0 5 0 3 0 4 0 0 0 0 0 0 0 0 2 0 0 0
    0 0 0 0 2 4 0 0 0 0 0 0 1 0 3 0 0 0
    0 0 0 0 2 4 0 0 0 0 0 1 0 0 1 0 0 0
    0 0 0 2 1 4 0 0 0 0 1 0 0 0 0 0 0 0
< /BinCounts>
< /Descriptor>
    :
```

IMAGE PROCESSING APPARATUS AND METHOD

BACKGROUND OF THE INVENTION

1. Field of the Invention

The present invention relates to an image processing technique for generating data by applying compression processing to an image obtained by reading a paper original, etc.

2. Description of the Related Art

The digitization of documents has been advanced in recent years by the spread of scanners. However, when a digitized document in a full-color bitmap format is to be stored, approximately 24 MB are required at 300 dpi in the case, for example, of an A4-sized original. Thus a very large amount storage space is required. Further, such a large quantity of data is not well-suited to electronic transmission.

In general, therefore, compression processing is applied to the full-color image data. The JPEG scheme is well-known as one such compression scheme. The JPEG scheme is highly effective in compressing natural images such as a photograph and affords a high image quality. On the other hand, when a high-frequency portion such as a text image is subjected to JPEG compression, image degradation referred to as "mosquito noise" occurs and the compression rate declines as well. Documents in common use often contain both text and images on the same page and it is difficult to obtain both good image quality and a high compression rate using JPEG compression.

One method that has been proposed in order to solve this problem includes segmentation of an image into regions, applications of JPEG compression to a background portion of the image from which text regions have been removed and application of MMR compression to text regions having color information. When data thus compressed is decompressed, text images obtained by decompressing the MMR-compressed part of the image are placed upon a background image obtained by decompressing the JPEG-compressed image. That is, with regard to white portions among the text images, the background image is allowed to pass and the representative character color is placed upon the black portions. For example, an image processing apparatus disclosed in the specification of Japanese Patent Application Laid-Open No. 2002-077633 creates output data from an image, which has been obtained by scanning in a paper document, by applying lossless compression to text regions through binarization of these regions without a decline in resolution, and applying highly aggressive JPEG compression to the background image with lowered resolution. As a result, a large scale reduction in size can be achieved while maintaining the color information and without sacrificing text readability, and it is possible to obtain a digitized document ideal for transmission or storage.

Meanwhile, due to the spread of computers, operations such as the creation and editing of documents using document editing applications like word processors is now commonplace. There is a growing demand not only for the ability to view documents stored in electronic form as described above, but also for the ability to use images in portions of one document by inserting the images into other documents. However, since a document that has been put into electronic form by scanning is compressed in order to improve storage efficiency as mentioned above, degradation of the image by this compression becomes a trouble in cases where the image is utilized in the creation of another document.

In a document that has been put into electronic form by the image processing apparatus disclosed in the specification of Japanese Patent Application Laid-Open No. 2002-077633, if the data is from a text region, because it undergoes lossless compression and is stored without a decrease in resolution, it is possible to extract and utilize images from this region without concern over image degradation. However, since regions other than the text region undergo high-compression processing as a background region, the problem of image degradation at the time of utilization cannot be avoided.

Because of greater opportunities to create documents electronically, there are many cases in which the original of a paper document that is to be scanned has been created by one's own computer or by a computer on a LAN. There are also many cases in which the original data of image areas such as photographs and drawings contained in such a document has been stored somewhere. Accordingly, it may be construed that there are many instances in which the original data can be obtained if an image database connected to a LAN, for example, is searched. If an image region such as a photograph or drawing is utilized in such an environment, it is possible to create another document having a high image quality by utilizing the original image data rather than compression-degraded image data contained in a document digitized earlier. In such case the original image data is obtained by searching the image database using as a key the image data representing the photograph or drawing, etc., of the digitized document.

There is an arrangement in which a feature amount that is for the purpose of searching image data is registered by a human being through use of a keyword or the like, and an arrangement in which the feature amount is extracted from image data by computer. The latter is referred to as an image feature amount, which may be a color histogram, a color structure, an edge histogram or texture, etc., extracted from an image.

In addition to image feature amounts, a description method has been standardized by MPEG-7 Visual (ISO/IEC 15938-3), etc. For example, in an image database having image feature amounts that are in compliance with this standard, the original image data can be retrieved by acquiring an image feature amount complying with the same standard.

However, when searching for an image feature amount, in an image database, from heavily compressed data such as digitized document data, a problem arises in that a precise search cannot be conducted because of the degradation of the images due to the effects of compression. For example, in cases where a search is conducted using an image feature amount such as an edge histogram, it is difficult to obtain a given feature amount, which correctly expresses the feature amount of the original image, from an image that has undergone lossy compression at a high compression rate. The reason for this is that in the case of an image whose resolution has been lowered in order to reduce its size or an image that has been subjected to JPEG compression at a high compression rate, some high-frequency information such as that of an edge is lost.

SUMMARY OF THE INVENTION

Accordingly, an object of the present invention is to make possible the generation of data in which an excellent search result can be obtained in relation to an image portion contained in a paper original or the like while data sizes suitable for transmission and storage are achieved when digitizing and compressing the image of the paper original.

According to one aspect of the present invention, there is provided an image processing apparatus comprising: a region segmentation unit adapted to segment an image into a plurality of regions in accordance with attributes of a plurality of types; a feature amount acquisition unit adapted to acquire feature amount data from image information of a region of a first attribute; a compression unit adapted to apply compression processing to the image and acquiring compressed data; and an output unit adapted to output the feature amount data and the compressed data as output data of the image.

Furthermore, according to another aspect of the present invention, there is provided an image processing method comprising: a region segmentation step of segmenting an image into a plurality of regions in accordance with attributes of a plurality of types; a feature amount acquisition step of acquiring feature amount data from image information of a region of a first attribute; a compression step of applying compression processing to the image and acquiring compressed data; and a output step of outputting the feature amount data and the compressed data as output data of the image.

Further feature amounts of the present invention will become apparent from the following description of exemplary embodiments with reference to attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are flowcharts useful in describing processing for transmission and archiving according to this embodiment;

FIG. 8 is a diagram illustrating an example of code description in an edge-histogram image feature amount;

DESCRIPTION OF THE EMBODIMENTS

A preferred embodiment of the present invention will now be described in detail in accordance with the accompanying drawings.

Figure 1:
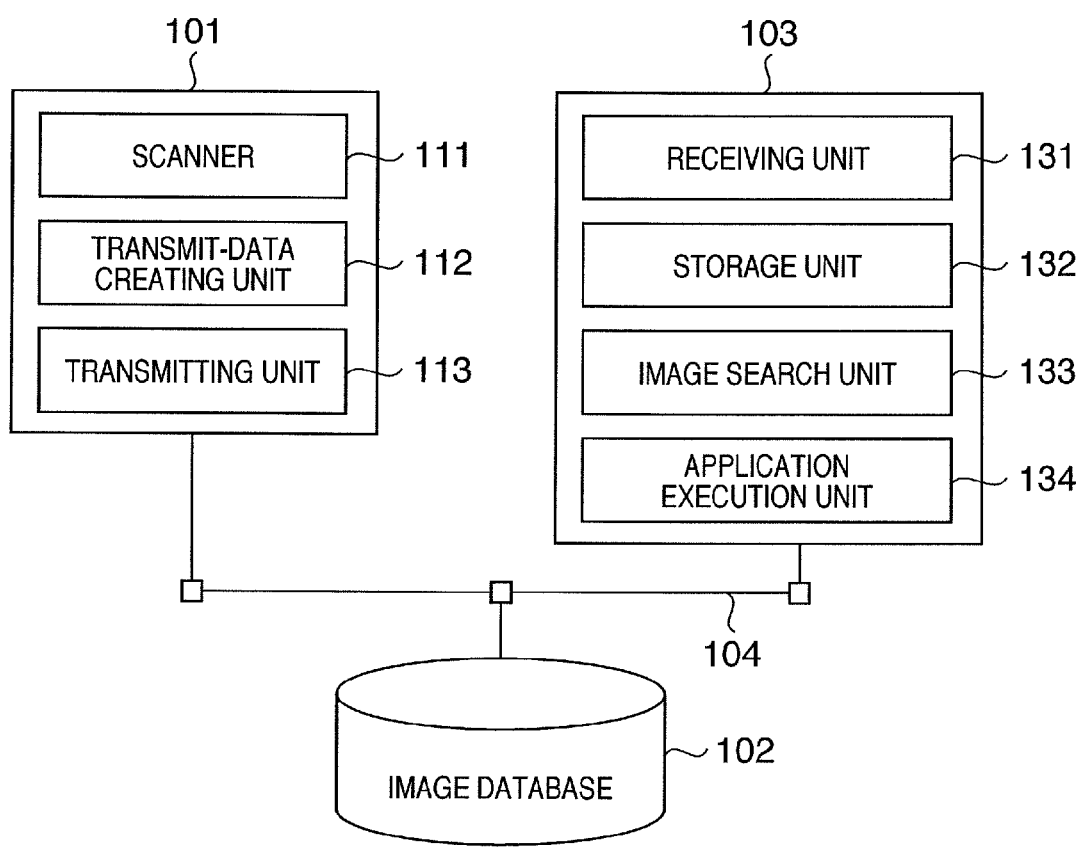
FIG. 1 is a block diagram illustrating an example of the configuration of an information processing system according to an embodiment of the present invention.

FIG. 1 is a block diagram illustrating an example of the configuration of an information processing system according to an embodiment of the present invention. As shown in FIG. 1, an image processing apparatus 101 includes a scanner 111, a transmit-data creating unit 112 and a transmitting unit 113. The scanner 111 opto-electronically converts a paper original and generates image data. The transmit-data creating unit 112 applies processing such as compression to the image data obtained by the scanner 111 and creates transmit data. The transmitting unit 113 transmits the transmit data, which has been created by the transmit-data creating unit 112, to the exterior of the apparatus (to an image database 102 or computer 103). It should be noted that the image processing apparatus 101 may be implemented by providing a scanning device with the transmit-data creating unit 112 or in a form in which a scanning device serving as the scanner 111 is connected locally to a general-purpose computer.

Data such as a photograph or drawing has been stored in the image database 102. The computer 103 can be implemented by a general-purpose computer (e.g., a personal computer). The computer 103 functions as a receiving unit 131, storage unit 132, image search unit 133 and application execution unit 134 owing to cooperation between software and hardware such as a CPU, memory and network interface, which are not shown. The receiving unit 131 receives the transmit data that has been transmitted from the image processing apparatus 101 (transmitting unit 113). The storage unit 132 stores the receive data that has been received by the receiving unit 131. The storage unit 132 can be implemented by a semiconductor memory or hard disk, etc. The image search unit 133 searches the image database 102 and retrieves the required image data. The application execution unit 134 executes a program that utilizes this data (image data).

The image processing apparatus 101, image database 102 and computer 103 are connected by a wired or wireless network 104 such as a LAN or the Internet so as to be capable of communicating with one another.

An overview of processing based upon an embodiment implemented using the image processing system of FIG. 1 will be described by splitting it into first and second processing. The first processing is transmission and archiving processing through which the image processing apparatus 101 scans a paper original in accordance with a user's operation, transmits this data to the computer 103 and stores it within the computer. Here it will be assumed that the paper original scanned by the image processing apparatus 101 has been created by the image processing apparatus 101. However, the original may just as well be one created by another computer on the network 104. It will be assumed that the original data such as photographs and drawings contained in the original has been stored in the image database 102 as saved data.

In order to improve efficiency at the time of transmission and storage efficiency in transmission and archiving processing, the image data that has been scanned is subjected to compression at a very high compression rate. More specifically, the image of the original is segmented into text portions and portions other than text, and the text is subjected to color reduction such as binarization without lowering resolution to thereby convert the text to lossless compression code. Other images (images other than text) are converted to code of lossy, high compression with a reduction in resolution. Thus it is possible to compress the image of the original at a high compression rate.

The second processing is utilization processing through which the user creates new data by utilizing some of the data saved earlier. An example of such processing includes using the application execution unit 134 in the computer 103 to execute an application having a document editing function, selectively extracting a photograph or drawing or an image of a text portion contained in the saved data, and inserting the selected item in the document being edited.

Image data capable of being extracted from saved data that was saved by the transmission and archiving processing is such that text portions have a high resolution and have undergone lossless compression, whereas images of portions such as photographs and drawings have been lowered in resolution and have undergone lossy, high compression and therefore are of poor quality. Accordingly, in utilization processing, what corresponds to the original data of the image is searched from the image database 102. This data is utilized if it is capable of being acquired.

Transmission and archiving processing and utilization processing will be described in greater detail.

First, reference will be had to FIGS. 2A, 2B and to FIGS. 3, 4, 6 and 8 to describe transmission and archiving processing through which the image processing apparatus 101 scans in a paper original based on the user's operation, transmits the content to the computer 103 and archives it in the computer. FIG. 2A is a flowchart illustrating the operation of the image processing apparatus 101, and FIG. 2B is a flowchart illustrating the operation of the computer 103.

At step S201, the image processing apparatus 101 sets the transmission destination of the scanned-in data to a transmission destination that has been designated by the user via a user interface, not shown. It is assumed in this example that the computer 103 has been designated. Next, at step S202, the scanner 111 converts the image of the original to electronic image data by well-known opto-electronic conversion processing. This is followed by step S203, at which the transmit-data creating unit 112 applies prescribed processing such as compression or feature amount extraction to the image data obtained at step S202, thereby creating transmit data.

Figure 3:
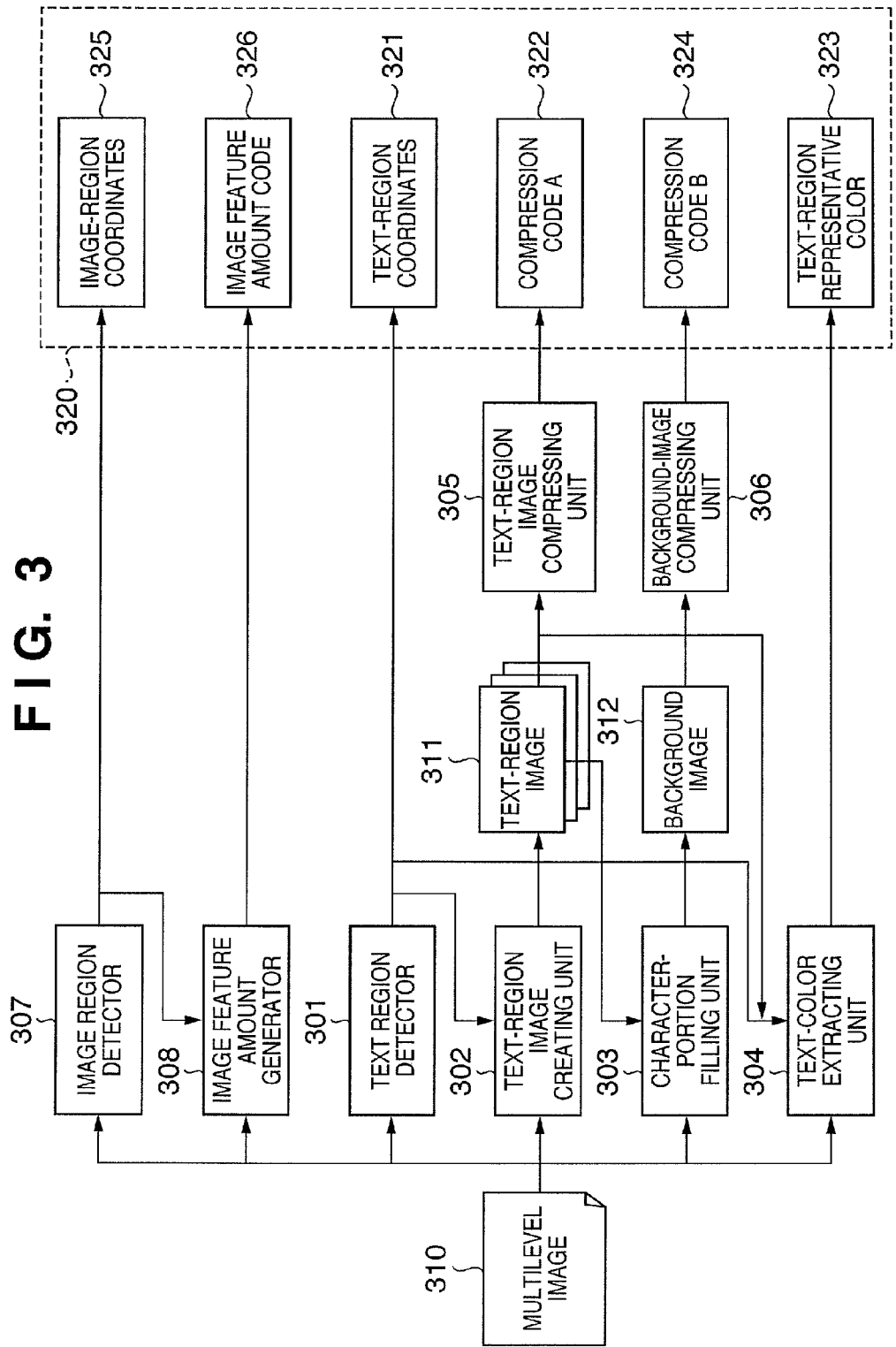
FIG. 3 is a block diagram illustrating a functional structure for creation of transmit data.

Processing executed by the transmit-data creating unit 112 at step S203 will be described in detail with reference to FIGS. 3 and 4. FIG. 3 is a block diagram illustrating an example of the detailed structure of the transmit-data creating unit 112, and FIG. 4 is a flowchart illustrating the details of processing executed by the transmit-data creating unit 112.

Figure 4:
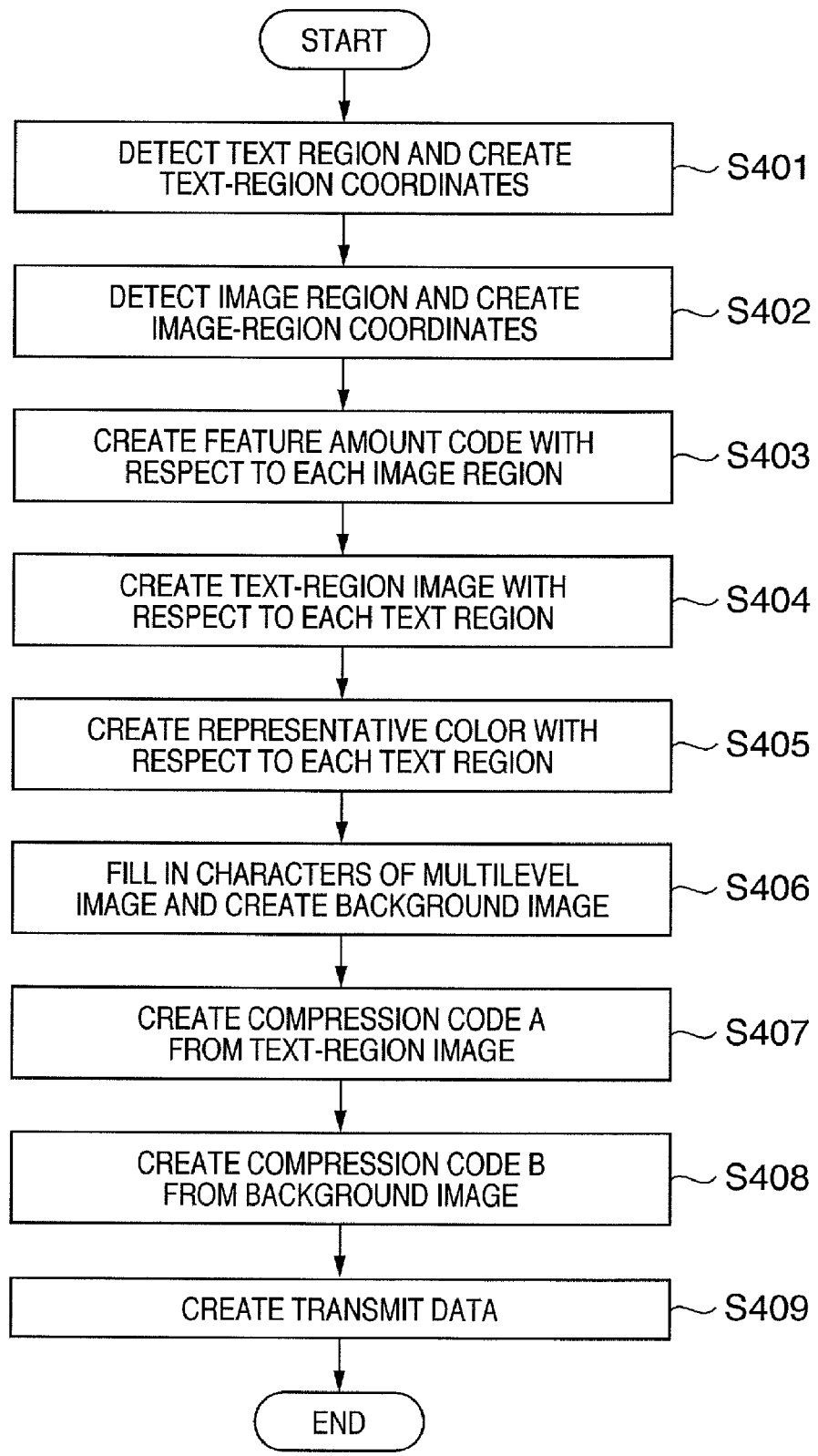
FIG. 4 is a flowchart illustrating processing for creating transmit data.

At step S401 in FIG. 4, a text region detector 301 detects a text region from a multilevel image 310 input thereto and creates a plurality of text-region coordinates 321. A well-known region segmentation technique can be used to detect the text region. The region segmentation technique is processing for segmenting one page of image data into regions having attributes of characters, drawings, photographs, lines and tables, etc. It should be noted that since a region segmentation technique is described in detail in the specification of U.S. Pat. No. 5,680,478, the contents thereof will be described here only in brief.

First, a black-and-white image is created by binarizing an input multilevel image. A well-known scheme can be applied as the binarizing method. Next, the black-and-white image is subjected to black-pixel contour tracing process, and clusters of black pixels are extracted. In the black-pixel tracing process, the contours of the clusters of black-pixels are traced by inspecting 8-directions from black-pixel of the contour. A cluster of black pixels of large area is subjected to white-pixel contour tracing process, and clusters of white pixels are extracted within the large cluster of black pixels. In the white-pixel tracing process, the contours of the cluster of white pixels by inspecting 4-directions from white pixel of the contour. Contour tracing of black pixels is performed again and clusters of black pixels are extracted from within white-pixel clusters having a size of a predetermined area or greater.

Next, the clusters of black pixels obtained are classified based on size, shape and density, etc., and, are classified by grouping if necessary. Thus, the clusters of black pixels are classified into attribute areas of a plurality of types having different attributes such as character, drawing, photograph, line and table. For example, items having an aspect ratio near unity and a size within a decided range are adopted as pixel clusters corresponding to text, and a portion in which such pixel clusters corresponding to text are close together and can be organized to form a group is decided upon as being a text region. Among black-pixel clusters from which these regions have been excluded, those flat pixel clusters that exceed a prescribed standard are decided upon as being line regions that are independent. Further, a region occupied by black-pixel clusters in which rectangular white-pixel clusters of a size greater than a predetermined size are encompassed in an aligned state, is decided upon as being a table region. A region in which portions having irregularly shaped pixel clusters scattered about are grouped together is decided upon as being a photograph region. A region, other than these regions, occupied by pixel clusters of any shape is decided upon as being a diagram region.

Figures 6A, 6B:
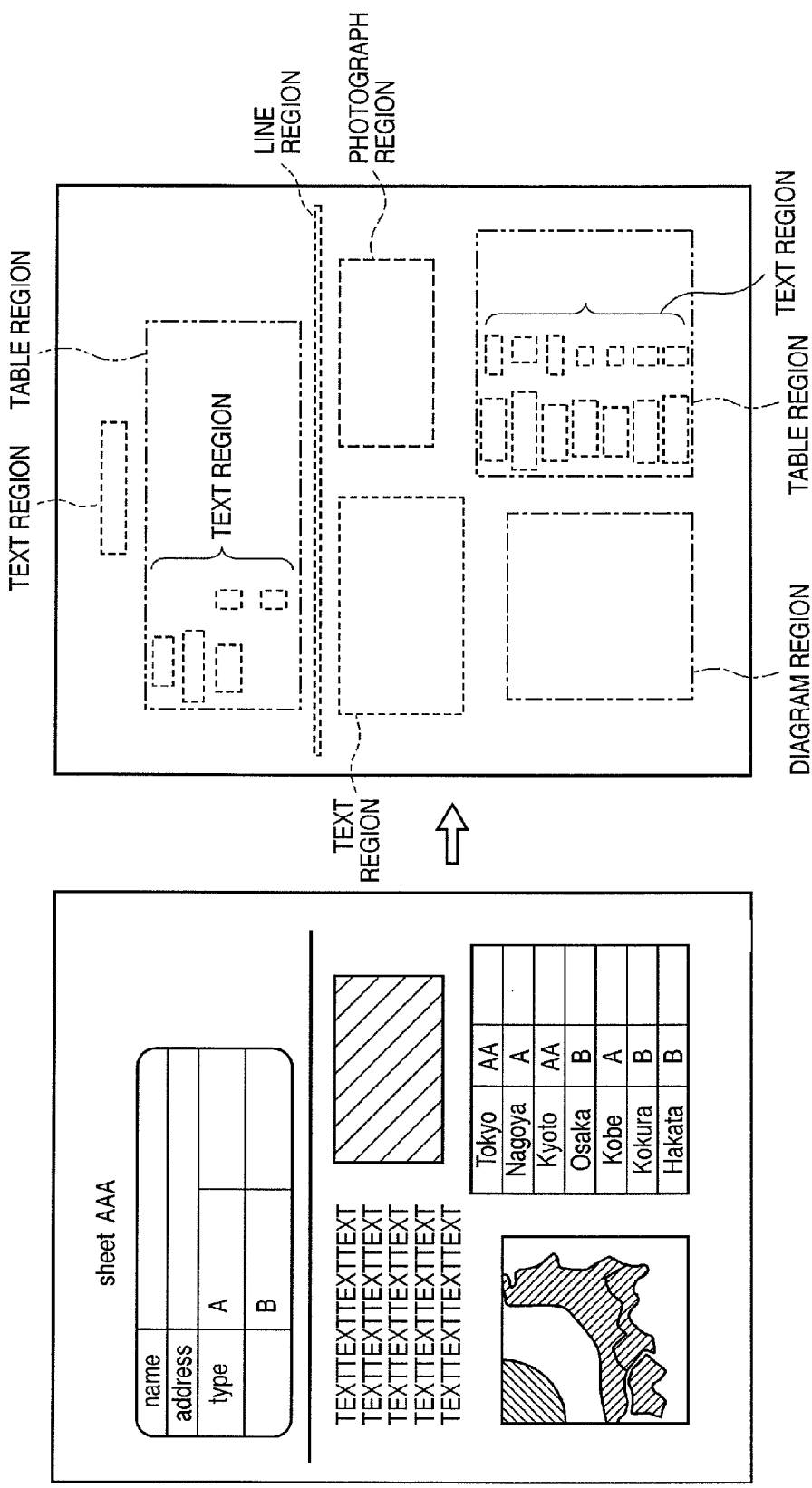
FIGS. 6A and 6B are diagrams illustrating an example of execution of region segmentation processing.

FIG. 6A illustrates an example of an input multilevel image to undergo region segmentation, and FIG. 6B illustrates an example of the result of region segmentation applied to the input multilevel image shown in FIG. 6A. By virtue of the processing of step S401 described above, the input multilevel image shown in FIG. 6A undergoes region segmentation is segmented as shown in FIG. 6B. Text-region coordinates 321 are created at step S401. These coordinates indicate the position and scope of a text region among a plurality of regions obtained by such region segmentation.

Next, at step S402, an image region detector 307 detects an image region such as a photograph region or diagram region in the input multilevel image 310 and creates a plurality of image-region coordinates 325. Detection of an image region can utilize the results of region segmentation processing executed at step S401. That is, a photograph region and diagram region obtained from the results of region segmentation processing are regarded as image regions and image-region coordinates indicating the positions and ranges of these regions are created.

This is followed by step S403, at which an image feature amount generator 308 creates a feature amount code 326, which indicates the image feature amount of each image, from the image-region coordinates 325 and input multilevel image 310. Examples of image feature amounts are a color histogram, a color structure, an edge histogram or texture, etc., extracted from an image. Since the purpose of feature amount extraction is to retrieve image data from the image database 102, the image feature amount generator 308 obtains an image feature amount, which is used in the image database 102, in accordance with a predetermined scheme.

In this embodiment, an edge histogram will be described as an example of an image feature amount used by the image database 102. In an edge histogram, first the image is divided into blocks in the form of a 4×4 grid. Five types of edge quantities are extracted from each block, namely a vertical edge, horizontal edge, 45° edge, 135° edge and edge without directionality. An edge histogram is a feature amount vector comprising a total of 4×4×5=80 edge quantities thus obtained. It should be noted that an edge quantity is the result of quantizing the total of a pixel count representing an edge as opposed to the overall pixel count of each block. More specifically, one block can be divided into a statistically satisfactory number of small areas and an edge quantity can be obtained from a luminance distribution in each of the small areas using a filter corresponding to the five types of edges mentioned above.

It should be noted that a feature amount may be in accordance with the type of feature amount used by the image database 102, and the method of acquiring the feature amount need not be uniform. Further, a feature amount may be extracted in the form of a combination of image feature amounts of a plurality of types.

A text-region image creating unit 302 creates a text-region image 311 from the text-region coordinates 321 and input multilevel image 310 at step S404. More specifically, a binary image is acquired by applying a well-known binarization technique to each text-region range of the input multilevel image 310. It should be noted that the pixel values in the binary image are such that "1" represents a pixel on a character line and "0" represents pixels other than these.

At step S405, a text-color extracting unit 304 calculates a representative color of a character line portion (a text-region representative color 323) while referring to the pixels of a character line portion of the text-region image 311 and original image. The text-color extracting unit 304 creates a thinned-line binary image obtained by slenderizing a character line portion of the corresponding text-region image and adopts the average value of the pixel values of the input multilevel image 310 corresponding to one pixel in terms of the thinned-line binary image as the text color of this region. It may be so arranged that in cases where a variance in the pixel value obtained is large, the text region is divided into character units and a text color is assigned to each unit.

At step S406, a character-portion filling unit 303 fills in pixels of the input multilevel image 310, which corresponds to black pixels of the text-region image 311, with a color equivalent to the surrounding color and creates a background image 312.

The filling of character portions is carried out as follows: The first step is to create a binary image obtained by thickening, by one pixel, the text-region image of interest. This performed in the following manner, by way of example: First, four images obtained by shifting a text-region image, which is a binary image, one dot upward, leftward, rightward and downward are created. Five images inclusive of the original image area created through overlapping by taking the OR of each of the pixels. The average pixel value on the input multilevel image 310 is found with respect to a pixel that is "0" on the binary image thus thickened. The character-portion pixels on the input multilevel image 310, i.e., pixels that are "1" with the thickened binary image, are filled with the average pixel value. Thus, filling inclusive of pixels that run into the color of the text surroundings is achieved and the background image 312, which will have a higher degree of flatness, is obtained.

At step S407, a text-region image compressing unit 305 compresses a plurality of the text-region images 311 and creates a plurality of compression codes (A) 322. Here it is assumed that the binary text-region pixels are each subjected to lossless compression by MMR to thereby create the compression code (A) 322.

Next, at step S408, a background-image compressing unit 306 compresses the background image 312 and creates compression code (B) 324. Here it is assumed that the background image 312 subjects the background image 312 to lossy compression using JPEG upon performing downsampling so as to obtain half the resolution, and creates the compression code (B) 324. It should be noted that the resolution conversion rate may be changed, as to 33% or 25%, etc., in accordance with the target compression rate.

Next, at step S409, the items of data of the text-region coordinates 321, compression code (A) 322, text-region-representative color 323, compression code (B) 324, image-region coordinates 325 and image feature amount code 326 are combined and adopted as transmit data 320. It is assumed that PDF is used as the format of the transmit data, and that the compression code (A) 322 and compression code (B) 324 are described as draw data. Although it is assumed that other information is described as metadata in the XML object format, another format, e.g., SVG, etc., may be used.

With regard to, e.g., the image feature amount code 326, an encoding method using MPEG-7 MDS (ISO/IEC 15938-5) and MPEG-7 Visual (ISO/IEC 15938-3) is available as a concrete example of a metadata description. FIG. 8 illustrates a code description example with respect to the edge-histogram image feature amount found at step S403. This ends transmit-data creation processing at step S203 in FIG. 2A.

Next, at step S204 in FIG. 2A, the transmit data created at step S203 is transmitted to the transmission destination (computer 103 in this example) designated by the transmitting unit 113 at step S201.

The flowchart of FIG. 2B illustrates the operation of the computer 103. At step S205 in FIG. 2B, the receiving unit 131 receives the data transmitted at step S204. Then, at step S206, the storage unit 132 stores the data received by the receiving unit 131. The storage unit 132 has a storage medium such as a hard disk.

Next, the processing for utilizing saved data, which is the second processing mentioned above, will be described in detail with reference to the flowchart of FIG. 5.

Figure 5:
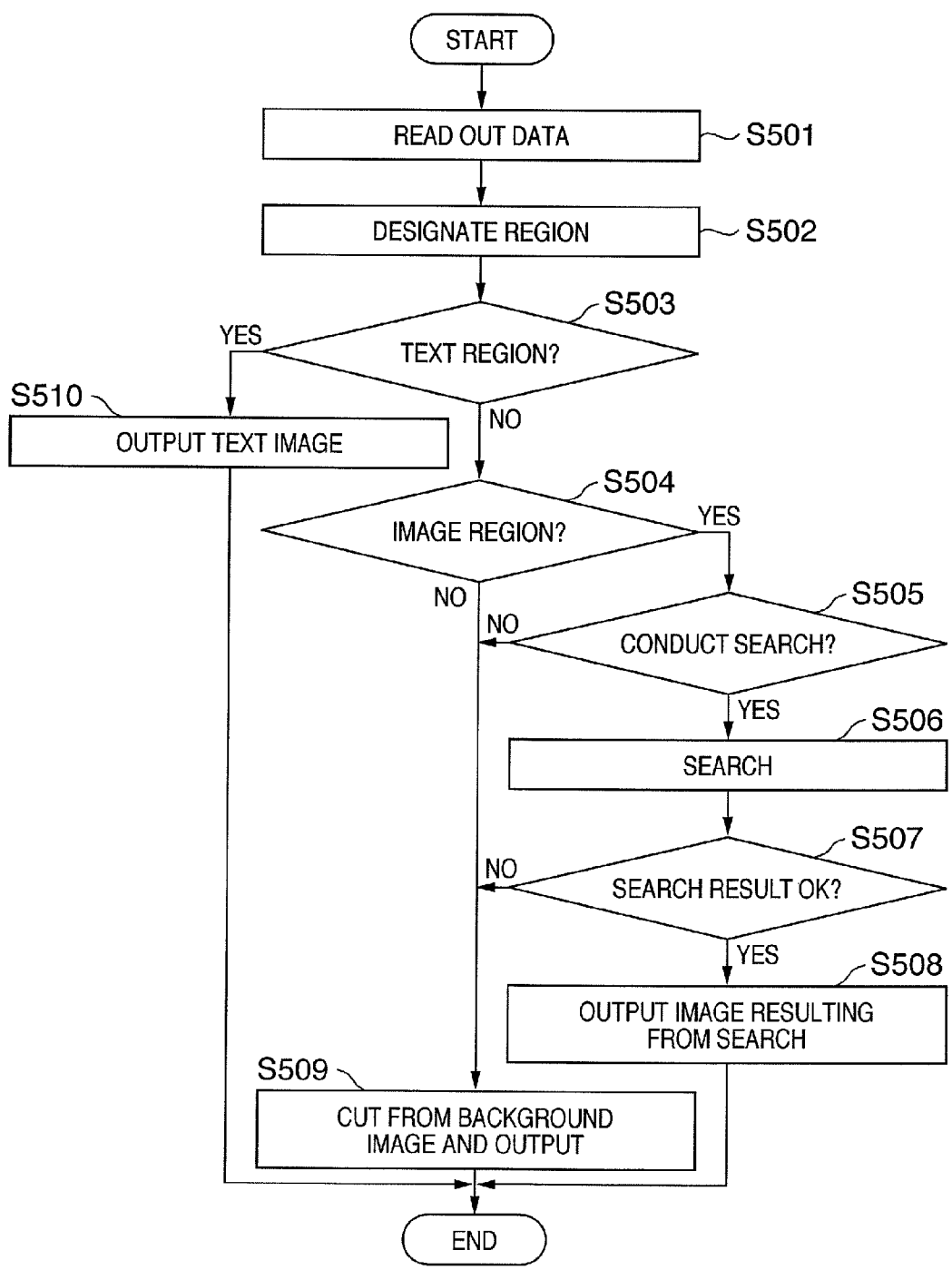
FIG. 5 is a flowchart illustrating processing for creating storage data.

At step S501 in FIG. 5, the data that has been stored in the storage unit 132 is read out based upon a designation made by the user. Next, at step S502, using a display (not shown), mouse and keyboard connected to the computer 103, the user makes a region designation as to which portion of a scanned page represented by the data is to be extracted.

Figure 7:
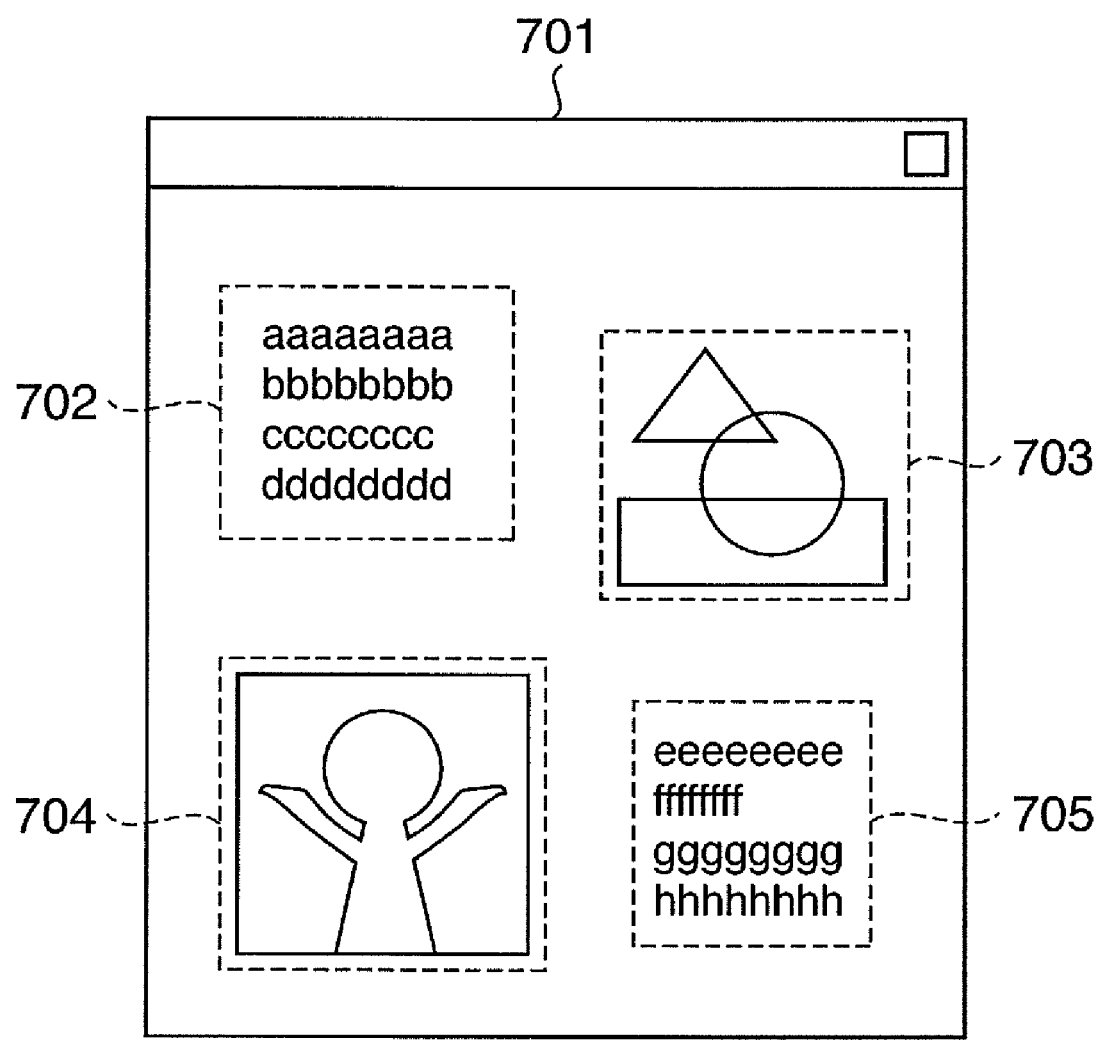
FIG. 7 is a diagram illustrating an example of a user-interface screen for designating regions in processing utilizing stored data.

FIG. 7 is an example of a user interface screen for when such a region designation is made. In FIG. 7, a page image 701 is one obtained by creating it from the transmit data 320 through expansion so as to reconstruct the page. More specifically, the page image 701 can be obtained by rendering, on the image obtained by decompressing the compression code (B) 324, the text image, which has been obtained by decompressing the compression code (A) 322, based upon the text-region coordinates 321. Areas 702 to 705 are frames indicating selectable areas. The areas 702 and 705 are frames for designating text regions corresponding to the text-region coordinates 321, the area 703 is a diagram region and the area 704 a photograph region (natural-image region), both of these being frames for designating image regions corresponding to the image-region coordinates 325. It should be noted that the frames corresponding to respective regions are displayed by referring to the image-region coordinates 325 and text-region coordinates 321.

By operating an ordinary graphical user interface that employs a mouse and keyboard, etc., the user can select any of the frames that designate the areas 702 to 705, thereby making it possible to designate an extraction area. Further, irrespective of these frames, any new frame can be created as by dragging a mouse with respect to a desired region, and the area within this frame can be adopted as an extraction area.

With reference again to FIG. 5, if the region designated at step S502 is found to be a text region at step S502, control proceeds to step S510. Here data corresponding to a designation area is output as image data, which is to be extracted, from image data obtained by decompressing the compression code (A) 322. Processing is then exited. In the case of a region other than a text region, control proceeds to step S504. Here it is determined whether the region designated at step S502 is an image region. If the region is an image region, then control proceeds to step S505. If it is other than an image region, i.e., if the designated region is neither a text region nor an image region, then the designated region is one designated freely by the user therefore control proceeds to step S509.

At step S505, the user is queried as to whether data that coincides with image data corresponding to the designated image region is to be acquired by searching the image database. If the user has specified a search, then control proceeds to step S506; otherwise, control proceeds to step S509.

Data that coincides with image data corresponding to the designated image region is retrieved from the image database 102 at step S506. That is, the feature amount code of the designated image region is acquired from the image feature amount code 326, this compared as a search key with feature amounts appended to each of the images contained in the image database 102, and a resembling image is extracted as a candidate. The comparison of feature amounts is performed using a method that conforms to the type of each feature amount. For example, in the case of the edge histogram described at step S403 in FIG. 4, the distance between the feature amount vectors of the two compared images is obtained. If this value is small (e.g., if the distance is less than a predetermined threshold value), then it is judged that the two images resemble each other.

At step S507, the user verifies whether the result of the search is correct. For example, the image obtained as a result of the search is displayed by a reduced-size image to allow verification by the user. Control proceeds to step S508 if it is determined that the result of the search is correct, and to step S509 if it is determined that the result of the search is incorrect. The verification method may be one commonly employed. For example, if there are multiple candidates in the results of the search, then these are presented and the user is allowed to select the correct one. In this case, if one candidate has been selected by the user, then it is determined that the result of the search is correct. The image data obtained by the search is output at step S508 as the image data to be extracted, and processing is exited.

If it is determined at step S503 and S504 that the designated region is neither a text region nor an image region, i.e., if it is determined that the designated region is one that has been designated freely by the user, then control proceeds to step S509. Here image data obtained by cutting only the portion of the designated region from the background image is output as image data to be extracted. Processing is then exited.

Thus, in accordance with this embodiment, as described above, a paper original is scanned by the image processing apparatus 101, and the resultant data is transmitted to and stored within the computer 103. At this time the image processing apparatus 101 applies lossless compression to text regions in the transmitted data without lowering resolution, and applies lossy compression to other regions while lowering the resolution thereof. As a result, the amount of data is reduced greatly without sacrificing the readability of text and the like, and the data obtained can be transmitted efficiently and stored efficiently.

Further, with regard to an image region contained in a portion that has undergone high compression, an image feature amount that was obtained from the image before the compression thereof is contained in the data. Accordingly, in cases where the user subsequently utilizes the data of this image region as by inserting it into another document, the original data of this relevant image region can be retrieved by using as a search key the image feature amount contained in the stored data. By thus using the image feature amount obtained from the image prior to compression, it is possible to obtain a search result the accuracy whereof is higher than the accuracy that would be obtained by retrieving the image using an image feature amount found from a background image that has been degraded by high compression. Ease of use is enhanced greatly as a result.

Thus, in accordance with the foregoing embodiment, when an image obtained by digitizing a paper original is compressed, data containing information by which an excellent search result will be obtained with respect to an image portion contained in the image can be generated while the size of the data is made suitable for transmission and storage.

Other Embodiments

In the embodiment set forth above, lossless compression is applied to a text region while a high resolution is maintained, processing for extracting an image feature amount is applied to an image region and high-compression lossy compression is applied to this region while lowering the resolution thereof. However, it may also be so arranged that a user can set to apply compression scheme exhibiting little degradation of information to any region other than a text region and extraction of an image feature amount is not carried out instead.

In cases where the above-described operation is implemented, it is so arranged as to enable the user to select, for every region or every attribute, a compression scheme in which there is significant degradation of information, or a compression scheme of little information degradation without appending an image feature amount. Further, it is permissible to adopt an arrangement in which the appending of an image feature amount to a region for which a compression scheme of little information degradation has been selected is inhibited automatically.

Further, in cases where image regions contained in an original are only natural images that are smooth and have less edges, degradation of information will be small even if image size is reduced greatly by JPEG compression. In such cases there is the possibility that an increase in amount of data due to appending of a feature amount will lower, rather than raise, the efficiency of transmission and storage. In such cases, therefore, the efficiency of transmission and storage of data transmitted can be maintained by specifying that an image feature amount should not be added on.

Further, with respect to a region to which an image feature amount has not been appended, a feature amount can be extracted from image data that has been compressed by a scheme with little degradation of information even in the case mentioned above. Accuracy in cases where a search is conducted, therefore, can be maintained. Accordingly, when a paper original is digitized and compressed, data for which an excellent search result will be obtained with respect to an image portion contained in the image can be generated while the size of the data is made suitable for transmission and storage. In cases where such an operation is implemented, it will suffice to so arrange it that the user can select whether or not to append an image feature amount on a region-by-region basis.

Figure 9:
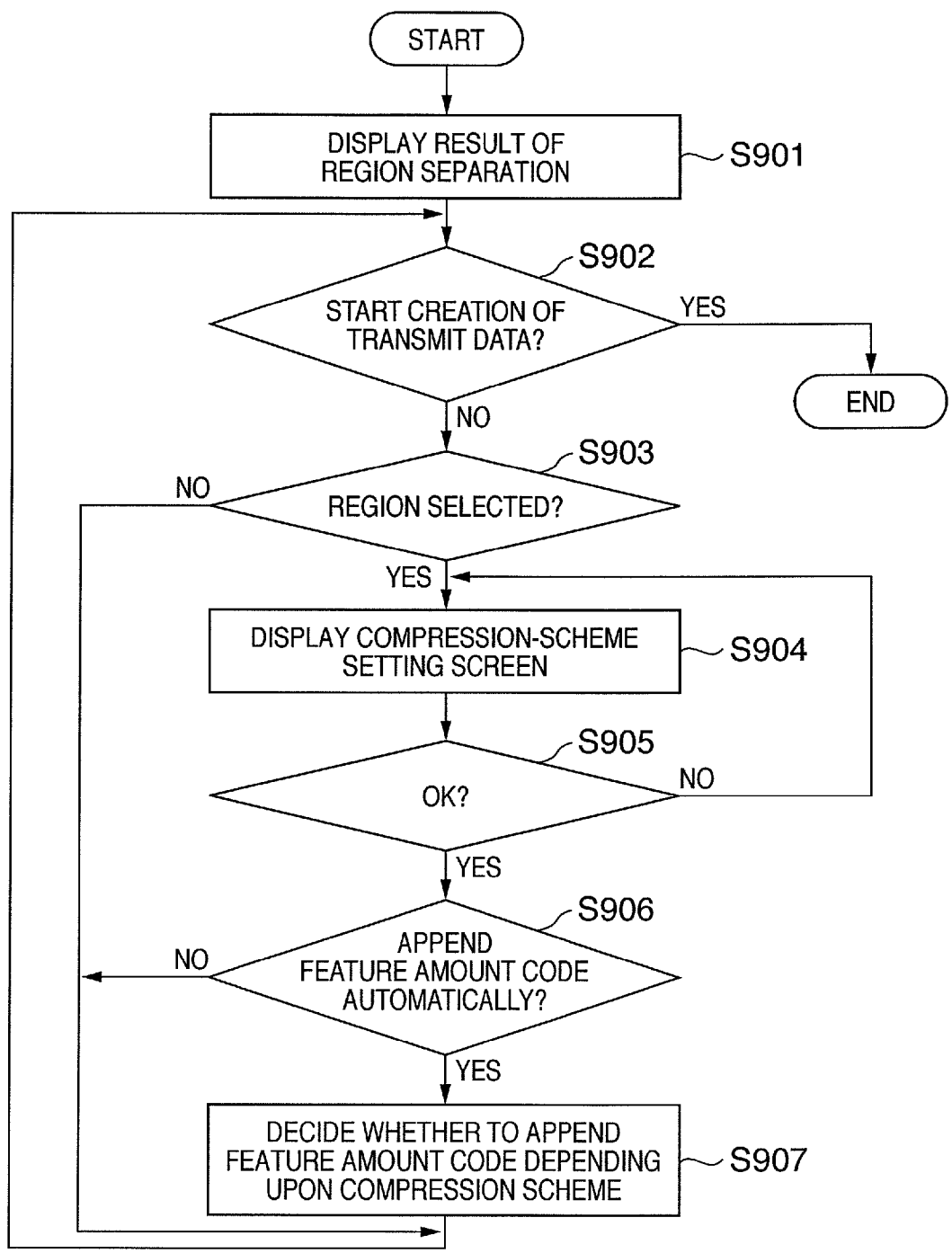
FIG. 9 is a flowchart useful in describing processing for setting a compression scheme and whether or not to generate a feature amount code on a per-region basis.
Figure 10:
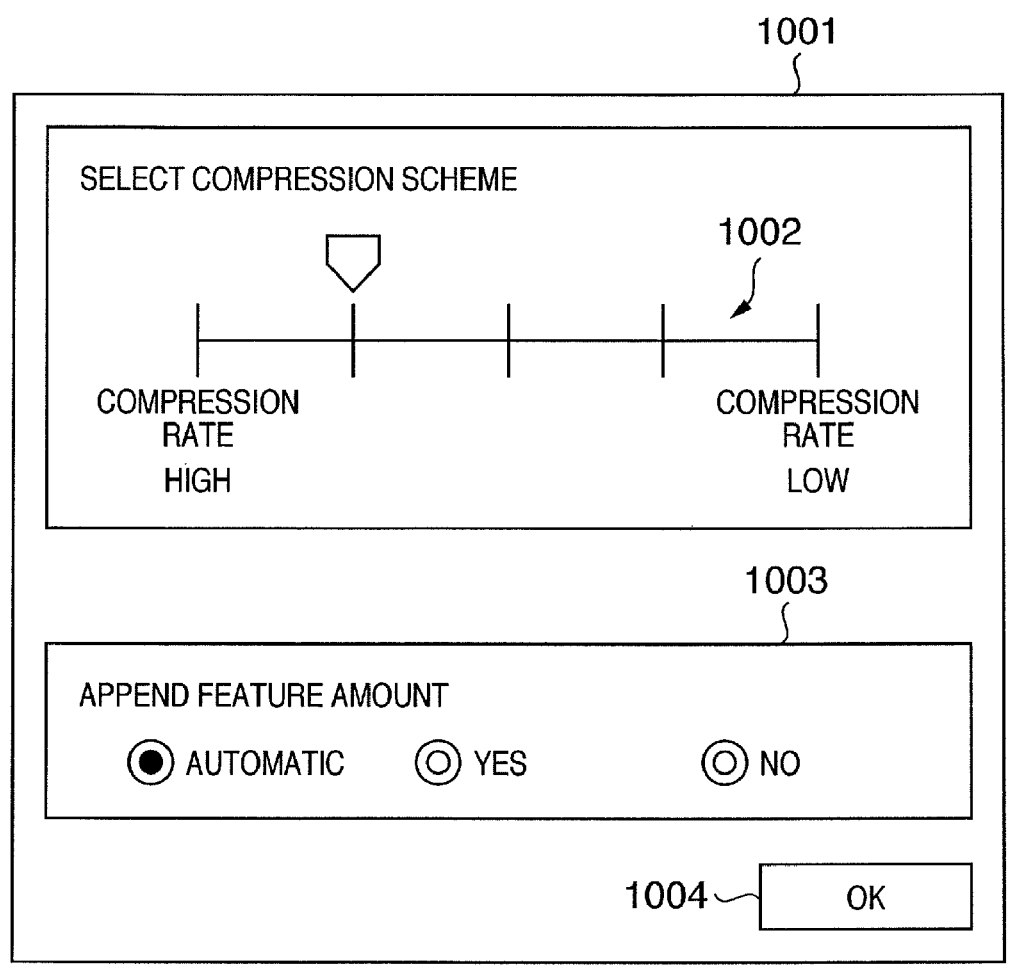
FIG. 10 is a diagram illustrating an example of a user interface for setting a compression scheme and whether or not to generate a feature amount code on a per-region basis.

Reference will be had to FIGS. 9 and 10 to describe processing for setting compression on a per-region basis as mentioned above. FIG. 9 is a flowchart useful in describing processing for setting a compression scheme. It is assumed that the processing shown in FIG. 9 is executed in processing for creating transmit data (step S203). Further, FIG. 10 is a diagram illustrating an example of an operating screen for setting a compression scheme and whether or not to generate a feature amount code on a per-region basis.

At step S901 in FIG. 9, the result of region division is displayed on a display unit (not shown) with which the image processing apparatus 101 is equipped. The display clearly indicates to the user the result of segmentation in the form of a frame enclosing each region obtained by region segmentation processing, as illustrated in FIG. 7. If the user specifies creation of transmit data under these conditions ("YES" at step S902), processing is exited and the transmit-data creation processing described above in conjunction with FIG. 4 starts.

On the other hand, if a graphic or photograph (natural image) image region is designated by the user ("NO" at step S902 and "YES" at step S903), then an operating screen 1001 of the kind shown in FIG. 10 is displayed on the display unit of the image processing apparatus 101 at step S904. Using the operating screen 1001, the user is capable of designating the compression scheme (the magnitude of the compression rate) with regard to the selected image region by a setting bar 1002. Further, whether or not a feature amount code is to be appended can be designated in relation to the image region by an operating section 1003. If appending of the feature amount code has been selected (YES" in FIG. 10), a feature amount code is calculated with respect to the image region. If appending of the feature amount code has not been selected ("NO" in FIG. 10) then a feature amount code is not calculated (not appended). If "AUTOMATIC" has been selected in FIG. 10, then whether or not a feature amount code is appended is decided automatically in dependence upon the set magnitude of the compression rate. It should be noted that a default setting may be such that a feature amount code is appended and selection of "YES" in the operation section 1003 is eliminated.

If an OK button 1004 is pressed in FIG. 10, then control proceeds from step S905 to step S906 and it is determined whether "AUTOMATIC" appending of a feature amount code has been selected. If "YES" or "NO" has been selected in FIG. 10, then control returns to step S902. If "AUTOMATIC" has been selected, then control proceeds to step S907. Here it is decided whether to append a feature amount code in relation to the relevant region based upon the compression scheme (compression rate) set by the setting bar 1002.

If creation of transmit data is subsequently designated and transmit-data creation processing illustrated in FIG. 10 starts from step S902, then the image feature amount generator 308 generates a feature amount code with regard to the region for which "appending" was designated. Further, the background-image compressing unit 306 performs compression at a compression rate set for every region in accordance with the image-region coordinates 325.

Thus, in accordance with the above embodiment, when a paper original is digitized and compressed, the embodiment extracts an image feature amount, which prevails before the application of high compression accompanied by image degradation to an image region contained in the original, and appends the image feature amount to the data resulting from compression. As a result, it is possible to generate data for which a highly accurate search is conducted in relation to the image region in the original while the amount of data is greatly reduced.

In accordance with the present invention, when a paper original is digitized and compressed, data for which excellent search results are obtained is generated in relation to an image portion contained in the original while a size suited to transmission and storage is maintained.

Although embodiments have been described above in detail, the present invention is capable of being worked as a system, apparatus, method, program or storage medium. More specifically, the present invention may be applied to a system comprising a plurality of devices and to an apparatus comprising a single device.

It should be noted that the present invention covers cases where the functions of the above-described embodiments are achieved by supplying a software program directly or remotely to a system or apparatus, reading the supplied program codes with a computer of the system or apparatus, and then executing the program codes. In this case, the program supplied is a program corresponding to the flowcharts illustrated in the drawings.

Accordingly, since the functional processing of the present invention is implemented by computer, the program codes per se installed in the computer also implement the present invention. In other words, the present invention also covers a computer program per se that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of recording media for supplying the program are a Floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the client computer can be connected to a website on the Internet using a browser possessed by the client computer, and the computer program of the present invention can be downloaded to a recording medium such as a hard disk. In this case, the program downloaded may be a file that contains automatically installable compressed functions. Further, the program of the present invention can be supplied by dividing the program code constituting the program into a plurality of files and downloading the files from different websites. In other words, a WWW (World Wide Web) server that downloads, to multiple users, the program files that implement the functional processing of the present invention by computer also is covered by the present invention.

Further, it is also possible to encrypt and store the program of the present invention on a storage medium such as a CD-ROM and distribute the storage medium to users. In this case, users who meet certain requirements are allowed to download decryption key information from a website via the Internet. It is possible to run the encrypted program upon decrypting it using the key information, whereby the program can be installed in the computer.

Further, the functions of the embodiments are implemented by having a computer execute a program that has been read. In addition, the functions of the embodiments may be implemented by cooperation with an operating system or the like running on the computer, based upon the indications in the program. In this case, the operating system or the like executes some or all of the actual processing, and the functions of the foregoing embodiments are implemented by this processing.

Furthermore, some or all of the functions of the foregoing embodiments may be implemented by writing the program, which has been read from the recording medium, to a memory provided on a function expansion board inserted into the computer or in a function expansion unit connected to the computer. In this case, after the program has been written to the function expansion board or function expansion unit, a CPU or the like provided on the function expansion board or function expansion unit performs some or all of the actual processing based upon the indications in the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-255613, filed on Sep. 2, 2005, which is hereby incorporated by reference herein in its entirety.

What is claimed is:

1. An image processing apparatus comprising:
a region segmentation unit adapted to segment an image into a plurality of regions, the plurality of segmented regions including a region of a first attribute and a region of a second attribute;
a feature amount acquisition unit adapted to acquire image feature amount data of the region of the first attribute from an image included in the region of the first attribute, wherein the feature amount acquisition unit does not acquire image feature amount data of the region of the second attribute;
a compression unit adapted to acquire compressed data of the region of the first attribute by applying lossy compression to the image corresponding to the region of the first attribute, and adapted to acquire compressed data of the region of the second attribute by applying lossless compression to the image corresponding to the region of the second attribute; and
an output unit adapted to output the image feature amount data of the region of the first attribute acquired by said feature amount acquisition unit and the compressed data acquired by said compression unit as output data of the image,
wherein the output image feature amount data is used for retrieving the compressed data of the region of the first attribute from a database which stores the output data of the image, and
wherein said feature amount acquisition unit acquires the image feature amount data of the region of the first attribute before said compression unit applies the lossy compression to the image corresponding to the region of the first attribute.

2. The apparatus according to claim 1, further comprising a coordinate acquisition unit adapted to acquire coordinate information indicating the position of the region in which the image feature amount data has been extracted by said feature amount acquisition unit;
wherein said output unit outputs the image feature amount data, the coordinate information and the compressed data as output data of the image.

3. The apparatus according to claim 1, wherein the region of the first attribute is an image region that includes a natural image and/or drawing, and the region of the second attribute is a text region.

4. The apparatus according to claim 3, wherein said compression unit acquires the compressed data of the region of the first attribute by applying the lossy compression to a background image obtained by filling the text region included in the image with a surrounding color.

5. The apparatus according to claim 1, wherein said compression unit acquires the compressed data of the region of the first attribute by applying the lossy compression after lowering resolution of image corresponding to the region of the first attribute.

6. An image processing method comprising:
a region segmentation step of segmenting an image into a plurality of regions, the plurality of segmented regions including a region of a first attribute and a region of a second attribute;
a feature amount acquisition step of acquiring image feature amount data of the region of the first attribute from an image included in the region of the first attribute, wherein image feature amount data of the region of the second attribute is not acquired in the feature amount acquisition step;
a compression step of acquiring compressed data of the region of the first attribute by applying lossy compression to the image corresponding to the region of the first attribute, and acquiring compressed data of the region of the second attribute by applying lossless compression to the image corresponding to the region of the second attribute; and
an output step of outputting the image feature amount data acquired in said feature amount acquisition step and the compressed data acquired in said compression step as output data of the image,
wherein the output image feature amount data is used for retrieving the compressed data of the region of the first attribute from a database which stores the output data of the image, and
wherein, in said feature amount acquisition step, the image feature amount data of the region of the first attribute is acquired before the lossy compression is applied to the image corresponding to the region of the first attribute in said compression step.

7. A control program stored in a non-transitory computer readable medium, for causing a computer to execute the image processing method set forth in claim 6.

8. A non-transitory computer readable storage medium storing a control program for causing a computer to execute the image processing method set forth in claim 6.

9. An image processing apparatus comprising:
a region segmentation unit adapted to segment an image into a plurality of regions;
a setting unit adapted to set one of compression schemes with regard to each of the plurality of regions obtained by said region segmentation unit;
a feature amount acquisition unit adapted to acquire, from the image, included in the region to which a compression scheme of significant information degradation is set by said setting unit, image feature amount data of the region to which the compression scheme of significant information degradation is set by said setting unit, wherein the feature amount acquisition unit does not acquire image feature amount data of the region to which the compression scheme of significant information degradation is not set by said setting unit;
a compression unit adapted to acquire compressed data of each of the plurality of regions by applying the set compression schemes to the image corresponding to each of the plurality of regions; and
an output unit adapted to output the image feature amount data acquired by said feature amount acquisition unit and the compressed data acquired by said compression unit as output data of the image,
wherein the output image feature amount data is used for retrieving the compressed data of the region, to which the compression scheme of significant information degradation is set by said setting unit, from a database which stores the output data of the image, and
wherein said feature amount acquisition unit acquires the image feature amount data of the region to which the compression scheme of significant information degradation is set by said setting unit before said compression unit applies the set compression schemes to the image corresponding to each of the plurality of regions.

10. The apparatus according to claim 1, further comprising setting unit for setting whether to perform acquisition of the image feature amount by said feature amount acquisition unit with respect to the region of the first attribute.

11. An image processing method comprising:

a region segmentation step of segmenting an image into a plurality of regions;

a setting step of setting one of compression schemes with regard to each of the plurality of regions obtained in said region segmentation step;

a feature amount acquisition step of acquiring, from the image included in the region to which a compression scheme of significant information degradation is set in said setting step, image feature amount data of the region to which the compression scheme of significant information degradation is set in said setting step, wherein image feature amount data of the region to which the compression scheme of significant information degradation is not set in said setting step is not acquired in said feature amount acquisition step;

a compression step of acquiring compressed data of each of the plurality of regions by applying the set compression schemes to the image corresponding to each of the plurality of regions; and an output step of outputting the image feature amount data acquired in said feature amount acquisition step and the compressed data acquired in said compression step as output data of the image, wherein the output image feature amount data is used for retrieving the compressed data of the region, to which the compression scheme of significant information degradation is set in said setting step, from a database which stores the output data of the image, and wherein said feature amount acquisition step acquires the image feature amount data of the region to which the compression scheme of significant information degradation is set in said setting step before said compression step applies the set compression schemes to the image corresponding to each of the plurality of regions.

* * * * *